US010675583B2

(12) United States Patent
Velasco Valcke

(10) Patent No.: US 10,675,583 B2
(45) Date of Patent: Jun. 9, 2020

(54) DEVICE FOR THE EXTRACTION OF WATER FROM THE ENVIRONMENT

(71) Applicant: PANACEA QUANTUM LEAP TECHNOLOGY LLC, Dallas, TX (US)

(72) Inventor: Francisco Javier Velasco Valcke, Bogotá (CO)

(73) Assignee: Panacea Quantum Leap Technology, LLC, Dallas, TX (US)

( * ) Notice: Subject to any disclaimer, the term of this patent is extended or adjusted under 35 U.S.C. 154(b) by 0 days.

(21) Appl. No.: 15/563,560

(22) PCT Filed: Mar. 30, 2016

(86) PCT No.: PCT/CO2016/000002
§ 371 (c)(1),
(2) Date: Sep. 29, 2017

(87) PCT Pub. No.: WO2016/155678
PCT Pub. Date: Oct. 6, 2016

(65) Prior Publication Data
US 2018/0078896 A1    Mar. 22, 2018

(30) Foreign Application Priority Data

Mar. 30, 2015    (CO) .................................. 15-072388

(51) Int. Cl.
*B01D 53/26* (2006.01)
*B01D 53/14* (2006.01)
(Continued)

(52) U.S. Cl.
CPC ........... *B01D 53/263* (2013.01); *B01D 53/02* (2013.01); *B01D 53/14* (2013.01);
(Continued)

(58) Field of Classification Search
CPC .............. F24F 3/1417; F24F 2003/144; B01D 2252/10; B01D 53/14; B01D 53/1425; B01D 53/18; B01D 53/263; E03B 3/28
(Continued)

(56) References Cited

U.S. PATENT DOCUMENTS

| 2,894,376 A | 7/1959 | Kelley |
| 3,064,952 A | 11/1962 | Brown |

(Continued)

FOREIGN PATENT DOCUMENTS

| CA | 895847 A | 3/1972 |
| DE | 19545335 A1 | 6/1997 |

(Continued)

OTHER PUBLICATIONS

Abdel-Salam, A. H, et al. Capacity Matching in Heat-Pump Membrane Liquid Dessicant Air Conditioning Systems. International Journal of Refrigeration, 48 (2014) 166-177.

*Primary Examiner* — Thuan D Dang
(74) *Attorney, Agent, or Firm* — The Morales Law Firm; Joseph L. Morales

(57) ABSTRACT

The invention refers to a device and a process for extracting water from the environment. The device comprises a means for capturing water from the environment by means of a liquid desiccant, an extraction chamber, a first duct through which liquid desiccant with water flows from the capture means to the extraction chamber, a second duct through which liquid desiccant flows from the extraction chamber to the capture means, a reservoir for depositing extracted water, a third duct through which water flows from the extraction chamber to the reservoir, a vacuum generator whose suction point and discharge point are operationally connected to the reservoir in order to suction the gas present in the reservoir and transfer gas into the reservoir, and a control device that controls the vacuum generator. The operation of the vacuum (Continued)

generator creates a pressure and temperature gradient that leads to evaporation of the water in the extraction chamber.

18 Claims, 4 Drawing Sheets

(51) Int. Cl.
   *F25B 39/02* (2006.01)
   *B01D 53/02* (2006.01)
   *F24F 3/14* (2006.01)
   *F25B 39/00* (2006.01)

(52) U.S. Cl.
   CPC ......... *B01D 53/1425* (2013.01); *B01D 53/26* (2013.01); *F24F 3/14* (2013.01); *F25B 39/00* (2013.01); *F25B 39/02* (2013.01); *B01D 2252/103* (2013.01); *B01D 2252/2023* (2013.01); *F24F 3/1417* (2013.01)

(58) Field of Classification Search
   USPC ...................................... 96/243; 95/231, 329
   See application file for complete search history.

(56) References Cited

U.S. PATENT DOCUMENTS

| | | | |
|---|---|---|---|
| 3,634,998 A | 1/1972 | Patterson | |
| 4,900,448 A | 2/1990 | Bonne et al. | |
| 6,216,483 B1 | 4/2001 | Potnis et al. | |
| 6,302,944 B1 | 10/2001 | Hoenig | |
| 6,514,321 B1 | 2/2003 | Lehto et al. | |
| 2002/0189448 A1 | 12/2002 | Spletzer et al. | |
| 2006/0130654 A1 | 6/2006 | King | |
| 2010/0013112 A1 | 1/2010 | Forkosh | |
| 2010/0090356 A1 | 4/2010 | Sines et al. | |
| 2013/0318790 A1 | 12/2013 | Becze et al. | |
| 2014/0150651 A1 | 6/2014 | Velasco Valcke | |
| 2017/0184318 A1 | 6/2017 | Velasco Valcke | |
| 2018/0126297 A1 | 5/2018 | Velasco Valcke | |

FOREIGN PATENT DOCUMENTS

| | | | |
|---|---|---|---|
| EP | 0016470 A1 | 10/1980 | |
| EP | 3135365 A2 | 3/2017 | |
| EP | 3278859 A1 | 2/2018 | |
| JP | 54456 A | 1/1979 | |
| JP | 54457 A | 1/1979 | |
| JP | 61149229 A | 7/1986 | |
| JP | 61164621 A | 7/1986 | |
| JP | 61259728 A | 11/1986 | |
| JP | 6223419 A | 1/1987 | |
| JP | 62023418 A | 1/1987 | |
| JP | 09210412 A | 8/1997 | |
| JP | 11132505 A | 5/1999 | |
| JP | 11132593 A | 5/1999 | |
| JP | 3946325 B2 | 7/2007 | |
| JP | 2013137110 A | 7/2013 | |
| JP | 6223418 B2 | 11/2017 | |
| WO | 9100759 A1 | 1/1991 | |
| WO | 2000027506 A1 | 5/2000 | |
| WO | 2012082093 A1 | 6/2012 | |
| WO | 2015113154 A1 | 8/2015 | |

DEVICE FOR THE EXTRACTION OF WATER FROM THE ENVIRONMENT

FIELD OF THE INVENTION

The present invention relates to dehumidifiers, and specifically, to systems that capture water from the environment by means of liquid desiccants.

DESCRIPTION OF THE PRIOR ART

The goal of dehumidification processes is to capture humidity from the environment using materials that tend to establish an equilibrium between the humidity level of their environment and the humidity level of said materials. When it is necessary to deal with high latent moisture loads, desiccants are used to decrease the moisture content of the air in thermal processes. Desiccants are chemical substances that have a high affinity for humidity, that is to say, they are capable of extracting water vapor from the air, in comparatively large amounts relative to their weight and volume. The physical process that allows for the retention or release of humidity is the difference in vapor pressure between the surface of the desiccant and ambient air. Their water retention properties are due to surface adsorption and capillary condensation. Desiccants can be classified as absorbents, which experience chemical changes when they retain or release moisture, or as adsorbents, which retain or release moisture without experiencing chemical changes; that is, the only change is the addition of the mass of water vapor to the desiccant. Desiccants may be solid or liquid. Many liquid desiccants are absorbent.

The dehumidification of air by means of desiccants occurs when the vapor pressure at the surface of the desiccant is lower than the vapor pressure of ambient air. When the water vapor is adsorbed, the vapor pressure in the desiccant increases until it reaches equilibrium. This occurs when the vapor pressures in the desiccant and in the air are equal. In order to make the desiccant reusable, it must be regenerated, that is, it is necessary to remove the moisture therefrom. This regeneration, or release of adsorbed water vapor from the desiccant, is accomplished by heating it in order to increase its vapor pressure, thereby expelling the moisture from the desiccant.

Prior art discloses systems for absorbing moisture from the environment based on the use of liquid desiccant materials, wherein the liquid desiccant captures vapor present in the atmosphere, and subsequently releases it when heated and/or subjected to a pressure differential. A document that provides evidence for the above is US2002/0189448 A1, which discloses a device for manipulation of the water present in a fluid.

This document describes a device for capturing water from the environment that operates in batches, i.e., the process is not continuous. Moreover, it requires instrumentation to operate the piston pump and to manipulate the gates, and it requires at least one operator to operate the device.

BRIEF DESCRIPTION OF THE INVENTION

The present invention refers to a device that captures water from the environment by means of liquid desiccants.

The device comprises a means for capturing water from the environment by means of a liquid desiccant, an extraction chamber, a first duct through which liquid desiccant with water flows from the capture means to the extraction chamber, a second duct through which liquid desiccant flows from the extraction chamber to the capture means, a reservoir for depositing extracted water, a third duct through which water flows from the extraction chamber to the reservoir, a vacuum generator whose suction point and discharge point are operationally connected to the reservoir in order to suction the gas present in the reservoir and transfer gas into the reservoir, and a control device that controls the vacuum generator. The third duct enters the extraction chamber.

The liquid desiccant captures water from the environment by means of the capture means, thereby yielding liquid desiccant with water. The liquid desiccant with water is regenerated in the extraction chamber, in which a pressure and temperature gradient is created, thereby evaporating the water captured by the liquid desiccant. The pressure and temperature gradient is created by the water extracted from the liquid desiccant with water, since said extracted water is held in the third duct through which it flows toward a reservoir. While the extracted water is held therein, the pressure and temperature inside the extraction chamber increase.

The vacuum generator suctions the gas contained in the reservoir, and suctions the extracted water that flows through the third duct from the extraction chamber to the reservoir. The vacuum generator also delivers gas to the reservoir, thereby creating a pressure gradient inside the reservoir, which is transmitted by the extracted water contained in the third duct into the extraction chamber, thereby increasing the temperature of the extracted water contained in the third duct and in the extraction chamber. Consequently, the heat of the extracted water is transferred through the third duct toward the inside of the extraction chamber.

DETAILED DESCRIPTION OF THE INVENTION

The present invention discloses a device and a process for extracting water from the environment by means of a liquid desiccant.

Figure 1:
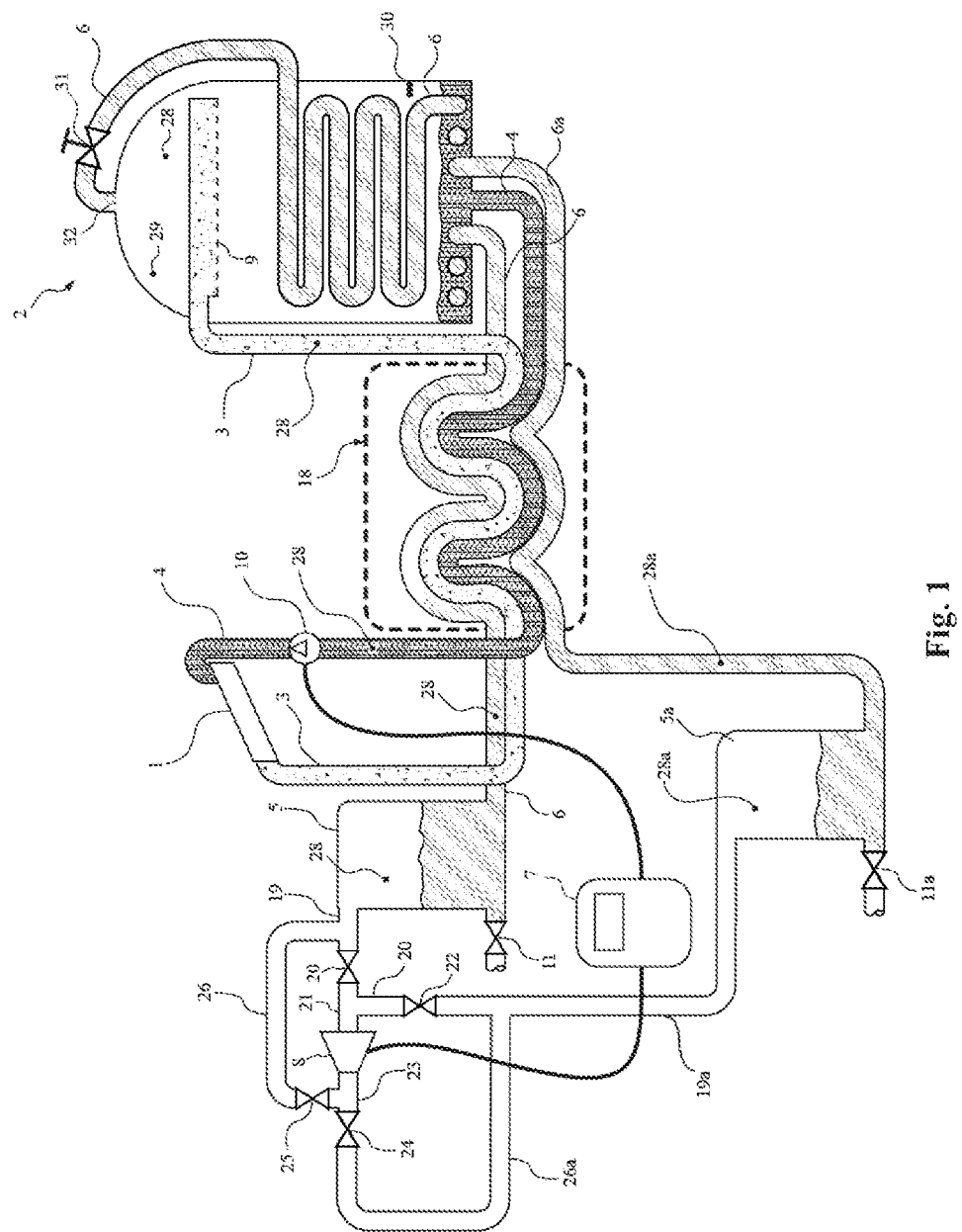
FIG. 1 shows one embodiment of the invention, in which the liquid desiccant with water is sprayed inside the extraction chamber by means of a sprayer. The third duct through which the extracted water flows enters the extraction chamber, where it is moistened with liquid desiccant with water that is sprayed by the sprayer, and the third duct is submerged in the liquid desiccant with water located at the bottom of the extraction chamber.

According to FIG. 1, the device of the present invention comprises:
- a capture means (1),
- an extraction chamber (2),
- a first duct (3) through which the liquid desiccant with water flows from the capture means (1) to the extraction chamber (2),
- a second duct (4) through which the liquid desiccant flows from the extraction chamber (2) to the capture means (1),
- a reservoir (5),
- a third duct (6) through which the extracted water flows from the extraction chamber (2) to the reservoir (5),
- a control device (7), and
- a vacuum generator (8).

The capture means (1) corresponds to the component of the device in which the liquid desiccant captures water from the environment. According to FIG. 1, FIG. 2 and FIG. 4, the capture means (1) is an inclined tray (which may comprise spirals or partitions) through which the liquid desiccant flows.

In one embodiment of the invention (not described herein), the capture means (1) is a reservoir in which the liquid desiccant is disposed of. A stream of ambient gas that comes into contact with the desiccant flows within the reservoir in order for water capture to be performed. The capture means (1) allows the liquid desiccant to come into contact with ambient gas, in such a way that said liquid desiccant capture the water present in the gas, thereby yielding liquid desiccant with water.

The ambient gas contains water. The ambient gas may be air or another gaseous fluid that contains water.

In one embodiment of the invention (not described herein), the capture means (1) comprises a means that causes ambient air to flow toward the tray on which the liquid desiccant flows or toward the reservoir in which the liquid desiccant is disposed of. This means is selected from the group consisting of a fan, a compressor, a turbine, or a combination of the above. The person having ordinary skill in the art shall understand that variations of the capture means (1) can be designed in order to optimize capture of water from the environment, depending on the needs of the device.

The extraction of water from the liquid desiccant with water is performed inside the extraction chamber (2), by evaporating the water captured at the capture means (1). The evaporation of water occurs when a pressure and temperature gradient are created inside the extraction chamber (2) and the third duct (6). The creation of the pressure and temperature gradient is explained in more detail below.

Figure 2:
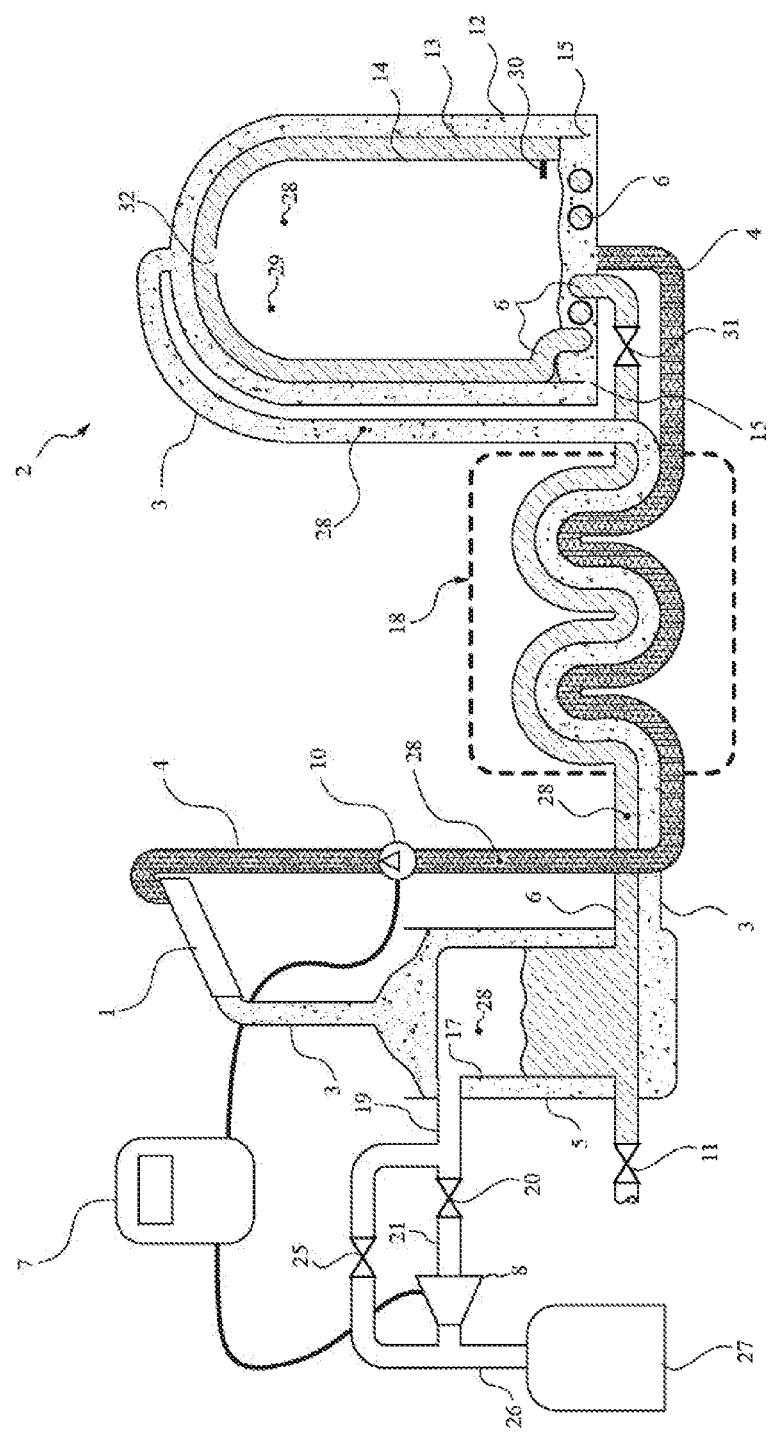
FIG. 2 shows an embodiment of the invention, wherein the gas used to create the pressure and temperature differential is reused when it is placed in a tank. The reservoir of the present invention contains a sealed tank, the extraction chamber is triple-jacketed, and the third duct through which extracted water flows is submerged in the liquid desiccant with water located at the bottom of the extraction chamber.

According to FIG. 1 and FIG. 2, the liquid desiccant with water flows through the first duct (3) from the capture means (1) to the extraction chamber (2).

According to FIG. 1, the sprayer (9), which is connected to the first duct (3), is placed inside the extraction chamber (2). The sprayer (9) sprays the liquid desiccant with water inside the extraction chamber (2), where, due to the pressure and temperature gradient inside the extraction chamber (2), the water evaporates from the liquid desiccant with water. The extracted water flows inside the extraction chamber (2) toward the top, enters through the inlet (32), and flows toward the third duct (6).

According to FIG. 1, the third duct (6) enters the extraction chamber (2), traversing the interior of the extraction chamber (2) to be moistened by the liquid desiccant with water that is sprayed by the sprayer (9). The liquid desiccant with water that comes into contact with the third duct (6) captures heat from the extracted water that flows through the third duct (6). When the liquid desiccant with water is heated, part of the water contained therein evaporates. The third duct (6) is submerged in the liquid desiccant with water located at the bottom of the extraction chamber (2), where it transfers heat to the liquid desiccant with water. The geometry defined by the path of the third duct (6) in the extraction chamber (2) can be U-shaped, spiral-shaped or of any other shape that allows for an increased area of contact between the third duct (6) and the liquid desiccant with water. The liquid desiccant exits the extraction chamber (2) through the second duct (4).

According to FIG. 2, in one embodiment of the invention, the extraction chamber (2) is triple-jacketed, wherein the liquid desiccant with water that flows through the first duct (3) enters through the top of the extraction chamber (2) and flows between the external jacket (12) and the internal jacket (13) until it flows to the bottom of the extraction chamber (2) through the holes (15). The holes (15) are located at the bottom of the internal jacket (13). The extracted water flows through the interior of the extraction chamber (2) toward the top, enters the boundary between the internal jacket (13) and the second internal jacket (14) through the inlet (32), and flows toward the bottom of the extraction chamber (2) within this boundary, for their subsequent exit from the extraction chamber (2) through the third duct (6).

In an additional embodiment of the invention (not described herein), the second internal jacket (14) is made of thermal insulation material. The extracted water that flows between the internal jacket (13) and the second internal jacket (14) transfers heat to the liquid desiccant with water that flows between the external jacket (12) and the internal jacket (13) and therefore, the temperature of the liquid desiccant with water increases while the temperature of the extracted water decreases, allowing it to condense, while simultaneously creating negative pressure within the extraction chamber (2).

According to FIG. 2, the third duct (6) enters at the bottom of the extraction chamber (2), submerged in the volume of liquid desiccant with water contained at the bottom of the extraction chamber (2). In this case, the third duct (6) transfers heat to the liquid desiccant with water, thereby increasing the latter's temperature and, at the same time, the extracted water condenses when its temperature decreases. The geometry defined by the path of the third duct (6) in the extraction chamber (2) can be U-shaped, spiral-shaped or of any other shape that allows for an increased area of contact between the third duct (6) and the liquid desiccant with water.

Figure 3:
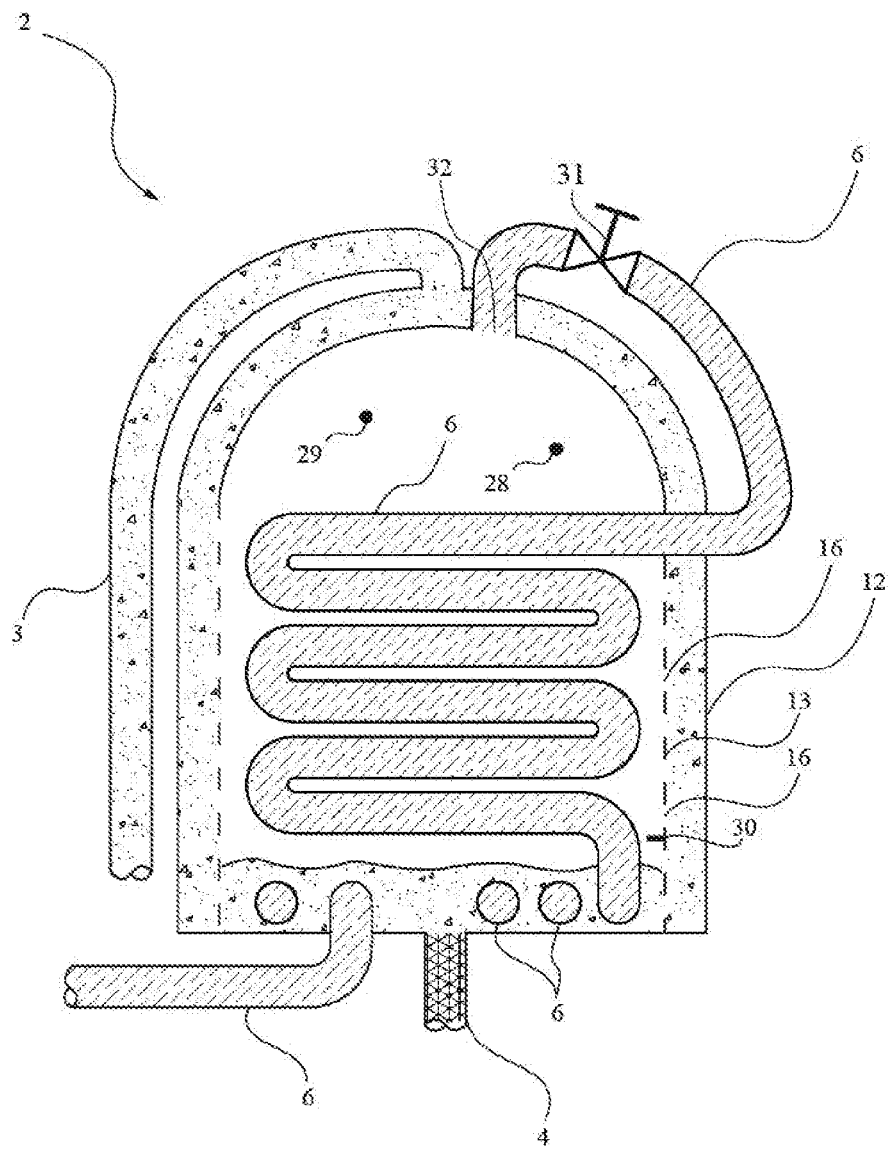
FIG. 3 shows an embodiment of the extraction chamber of the invention, which is double-jacketed and the internal jacket has holes through which liquid desiccant with water flows toward the interior of the extraction chamber, and the third duct through which extracted water flows enters the extraction chamber to be moistened with the liquid desiccant with water that flows through the holes. The third duct is also submerged in the liquid desiccant with water located at the bottom of the extraction chamber.

According to FIG. 3, in an additional embodiment of the invention, the extraction chamber (2) is double-jacketed, wherein the liquid desiccant with water that flows through the first duct (3) flows between the external jacket (12) and the internal jacket (13) when it enters the extraction chamber (2). The internal jacket (13) has holes (16) on its lateral boundary, through which the liquid desiccant with water flows toward the interior of the extraction chamber (2). The internal jacket (13) is made of a thermal insulation material.

The extracted water flows through the extraction chamber (2) toward the top, enters through the inlet (32), and flows through the third duct (6).

According to FIG. 3, the third duct (6) enters the extraction chamber (2), traversing the interior of the extraction chamber (2) to be moistened by the liquid desiccant with water that drains by gravity from the holes (16) toward the bottom of the extraction chamber (2). The liquid desiccant with water that comes into contact with the third duct (6) captures heat from the extracted water that flows through the third duct (6). When the liquid desiccant with water is heated, part of the water contained therein evaporates. The third duct (6) is submerged in the liquid desiccant with water located at the bottom of the extraction chamber (2), where it transfers heat to the liquid desiccant with water.

The geometry defined by the path of the third duct (6) in the bottom of the extraction chamber (2) can be U-shaped, spiral-shaped or of any other shape that allows for an increased area of contact between the third duct (6) and the liquid desiccant with water. The liquid desiccant exits the extraction chamber (2) through the second duct (4).

When the third duct (6) traverses the external boundary of the extraction chamber (2) before entering therein, the third duct (6) is preferably coated with a thermal insulation material to prevent the transfer of heat to the environment. Preferably, the extraction chamber (2) is coated with a thermal insulation material.

According to FIG. 1 and FIG. 2, the liquid desiccant, obtained by extracting the water from the liquid desiccant with water, flows toward the capture means (1) through the second duct (4). Along the second duct (4), a pump (10) is connected in order to pump the liquid desiccant toward the capture means (1).

According to FIG. 1 and FIG. 2, the water extracted in the extraction chamber (2) flows through the third duct (6) toward the reservoir (5). According to FIG. 1, FIG. 2 and FIG. 3, the valve (31) is placed along the third duct (6). The valve (31) allows the extracted water to flow from the extraction chamber (2) toward the reservoir (5) (not shown in FIG. 3).

According to FIG. 1 and FIG. 2, the first duct (3), the second duct (4) and the third duct (6) are operationally configured to constitute a heat exchanger (18). In the heat exchanger (18) if this embodiment of the invention, the third duct (6) and the second duct (4) transfer heat to the first duct (3).

In another embodiment of the invention (not described herein), the first duct (3) and the third duct (6) are operationally configured to constitute a heat exchanger (18), wherein the third duct (6) transfers heat to the first duct (3).

In another embodiment of the invention (not described herein), the first duct (3) and the second duct (4) are operationally configured to constitute a heat exchanger (18), wherein the second duct (4) transfers heat to the first duct (3).

Preferably, the heat exchanger (18) is coated with a thermal insulation jacket.

According to FIG. 1 and FIG. 2, the vacuum generator (8) is connected to the reservoir (5) in such a way that the following actions can be performed:

Suctioning the gas contained in the reservoir (5), thereby generating a vacuum within the reservoir (5) that suctions the extracted water that flows through the third duct (6) and extracts the extracted water contained in the extraction chamber (2); and Delivering gas to the reservoir (5), thereby creating a pressure gradient within the reservoir (5). The pressure gradient is transmitted by the extracted water and compresses the extracted water contained in the third duct (6), and meanwhile, the valve (31) is closed, preventing the extracted water from flowing toward the extraction chamber (2). The creation of the pressure gradient increases the temperature of the extracted water, thereby transferring heat through the third duct (6), causing the water to evaporate from the liquid desiccant with water.

According to FIG. 1, the valve (11) is connected to the reservoir (5), through which the extracted water disposed of in the reservoir (5) can be extracted. The vacuum generator (8) is connected to the reservoir (5). The suction point of the vacuum generator (8) is connected to the reservoir (5) by means of the fourth duct (19). A valve (20) is placed along the fourth duct (19). The fifth duct (21) is connected along the fourth duct (19), between the suction point of the vacuum generator (8) and the valve (20). A valve (22) is connected along the fifth duct (21). The discharge point of the vacuum generator (8) is connected to the sixth duct (23), to which the valve (24) is connected. The seventh duct (27) is connected along the sixth duct (23) by means of the valve (25); the valve (25) is connected to the sixth duct (23) between the discharge point of the vacuum generator (8) and the valve (24). The other end of the seventh duct (26) is connected along the fourth duct (19), between the reservoir (5) and the valve (20). According to the arrangement described above:

In order to create a vacuum inside the reservoir (5), valves (22) and (25) are kept closed and valves (20) and (24) are kept open. Thus, the vacuum generator (8) suctions the gas contained in the reservoir (5) and delivers it to the environment; and In order to create a pressure gradient inside the reservoir (5), valves (20) and (24) are kept closed and valves (22) and (25) are kept open. Thus, the vacuum generator (8) suctions gas from the environment and delivers it into the reservoir (5).

According to FIG. 2, in one embodiment of the invention, the reservoir (5) has a closed tank (17) located therein. The third duct (6) is connected to the tank (17), thereby transferring the water extracted from the extraction chamber (2) thereto. Liquid desiccant with water flows into the space formed between the tank (17) and the reservoir (5), and thus, the extracted water in the tank (17) transfers heat to the liquid desiccant with water before it enters the extraction chamber (2). In this embodiment of the invention, the valve (11) is connected to the tank (17). The vacuum generator (8) is connected to the tank (17). The suction point of the vacuum generator (8) is connected to the tank (17) by means of the fourth duct (19). A valve (20) is placed along the fourth duct (19). The discharge point of the vacuum generator (8) is connected to the container (27) by means of the seventh duct (26). The other end of the seventh duct (26) is connected along the fourth duct (19), between the tank (17) and the valve (20). The valve (25) is connected along the seventh duct (26). According to the arrangement described above:

In order to create a vacuum inside the tank (17), valve (25) is kept closed and valve (20) is kept open. Thus, the vacuum generator (8) suctions the gas contained in the tank (17) and delivers it under pressure to the container (27); and In order to create a pressure gradient inside the tank (17), valve (20) is kept closed and valve (25) is kept open. Thus, the container (27) delivers gas under pressure into the tank (17).

According to FIG. 1 and FIG. 2, when a vacuum is generated within the reservoir (5) or tank (17), respectively, the valve (31) is open, allowing extracted water to flow from the extraction chamber (2) toward the reservoir (5) or tank (17), respectively. This condition also produces a suction effect on the extracted water contained within the extraction chamber.

According to FIG. 1 and FIG. 2, when a pressure gradient is generated within the reservoir (5) or tank (17), respectively, the valve (31) is closed, preventing extracted water from flowing from the third duct (6) toward the extraction chamber (2). This condition causes:
- the extracted water present in the third duct (6) between the reservoir (5) or tank (17) and the valve (31) to increase in pressure, and consequently increase in temperature, and condense; and
- the pressure within the extraction chamber (2), and consequently the temperature, to increase, when holding the extracted water that does not flow through the third duct (6). The pressure within the extraction chamber (2) is lower than atmospheric pressure, in order to keep liquid desiccant with water flowing through the first duct (3).

A person having ordinary skill in the art would understand that the condition of opening and closing the valve (31) is applicable to the embodiment of the extraction chamber (2) shown in FIG. 3.

According to FIG. 1 and FIG. 2, the vacuum generator (8) is a compressor, although it may be a vacuum pump.

According to FIG. 1, FIG. 2 and FIG. 3, the device comprises:
- temperature sensors (28) placed in the extraction chamber (2), the reservoir (5), the first duct (3), the second duct (4), and the third duct (6).
- a pressure sensor (29) placed in the extraction chamber (2), and
- a fill-level sensor (30) placed in the extraction chamber (2).

According to FIG. 1 and FIG. 2, the control device (7) is connected to the vacuum generator (8) and the pump (10), for the purpose of switching them on or off, based on the data provided by the temperature sensors (28), the pressure sensor (29) and the fill-level sensor (30). The temperature sensors (28), the pressure sensor (29) and the fill-level sensor (30) are connected to the control device (7).

Figure 4:
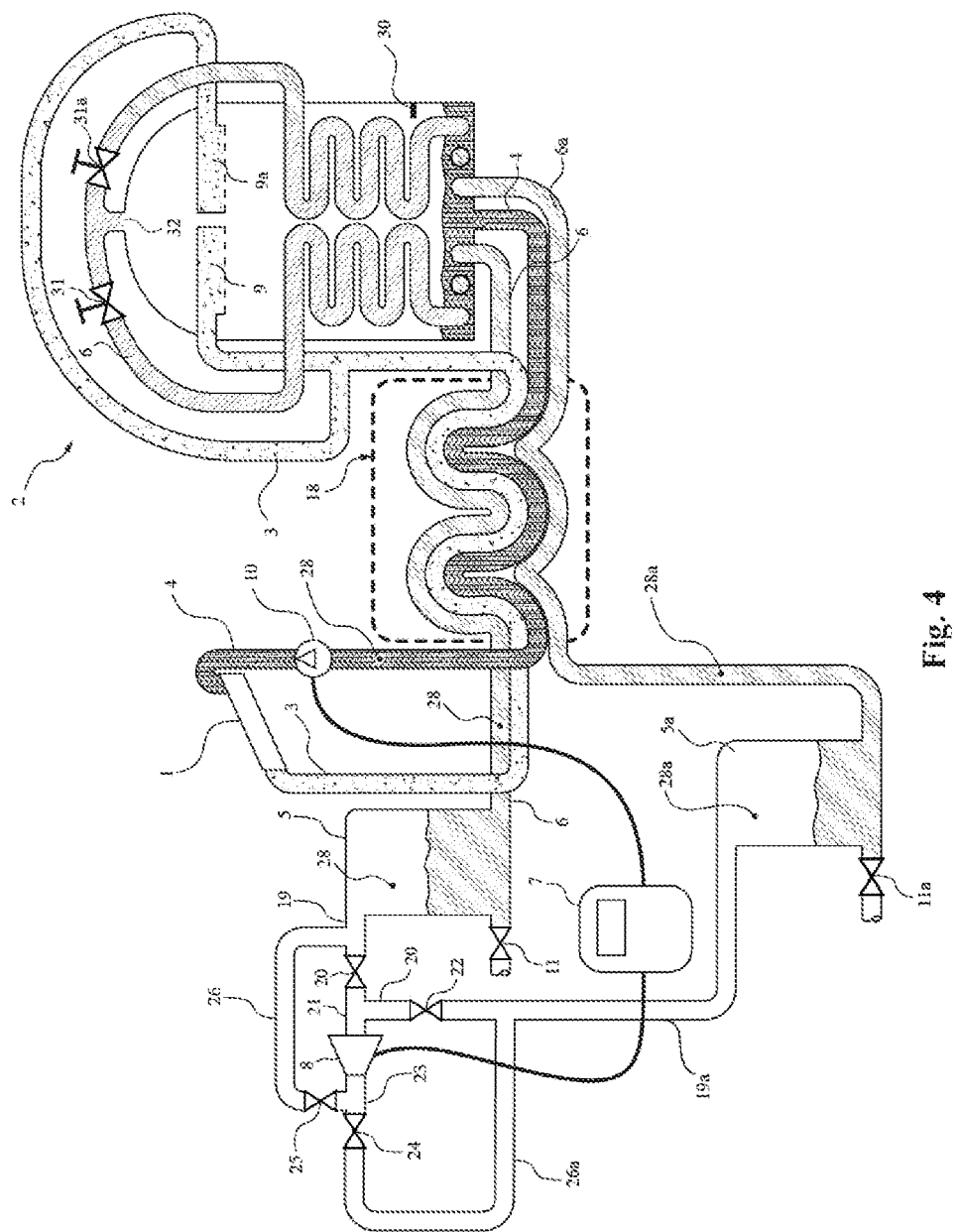
FIG. 4 shows one embodiment of the invention, in which the liquid desiccant with water is sprayed inside the extraction chamber by means of two sprayers. The third ducts through which the extracted water flow enter the extraction chamber, where they are moistened with liquid desiccant with water that is sprayed by the sprayers, and the third ducts are submerged in the liquid desiccant with water located at the bottom of the extraction chamber.

According to FIG. 4, in one embodiment of the invention, two sprayers (9) and (9a) are placed within the extraction chamber (2). The sprayers (9) and (9a) are connected to the first duct (3) through which liquid desiccant with water flows from the capture means (1). The sprayers (9) and (9a) spray the liquid desiccant with water inside the extraction chamber (2), where, due to the pressure and temperature gradient inside the third duct (6), the water evaporates from the liquid desiccant with water. The extracted water flows inside the extraction chamber (2) toward the top, enters through the inlet (32), and flows toward the third ducts (6) and (6a).

According to FIG. 4, the third ducts (6) and (6a) enter the extraction chamber (2), traversing the interior of the extraction chamber (2) to be moistened by the liquid desiccant with water that is sprayed by sprayers (9) and (9a), respectively. The liquid desiccant with water that comes into contact with the third ducts (6) and (6a) captures heat from the extracted water that flows through the third ducts (6) and (6a). When the liquid desiccant with water is heated, part of the water contained therein evaporates. The third ducts (6) and (6a) are submerged in the liquid desiccant with water located at the bottom of the extraction chamber (2), where they transfer heat to the liquid desiccant with water. The geometry defined by the path of the third ducts (6) and (6a) in the extraction chamber (2) can be U-shaped, spiral-shaped or of any other shape that allows for an increased area of contact between the third ducts (6) and (6a) and the liquid desiccant with water. The liquid desiccant exits the extraction chamber (2) through the second duct (4) toward the capture means (1). Along the second duct (4), a pump (10) is connected in order to pump the liquid desiccant toward the capture means (1).

According to FIG. 4, the water extracted in the extraction chamber (2) flows through the third duct (6) toward the reservoir (5), and through the third duct (6a) toward the reservoir (5a). The valves (31) and (31a) are placed along the third ducts (6) and (6a), respectively.

According to FIG. 4, the embodiment gas reservoirs (5) and (5a), to which the valves (11) and (11a) are connected, respectively, by means of which extracted water can be extracted. The vacuum generator (8) is connected to the reservoirs (5) and (5a). The suction point of the vacuum generator (8) is connected to the reservoir (5) by means of the fourth duct (19). A valve (20) is placed along the fourth duct (19). The fifth duct (21) is connected along the fourth duct (19), between the suction point of the vacuum generator (8) and the valve (20). A valve (22) is connected along the fifth duct (21). The discharge point of the vacuum generator (8) is connected to the sixth duct (23), to which the valve (24) is connected. The seventh duct (27) is connected along the sixth duct (23) by means of the valve (25); the valve (25) is connected to the sixth duct (23) between the discharge point of the vacuum generator (8) and the valve (24). The other end of the seventh duct (26) is connected along the fourth duct (19), between the reservoir (5) and the valve (20). The suction point of the vacuum generator (8) is connected to the reservoir (5a) by means of the fourth duct (19a). The fourth duct (19a) is connected to the valve (22). One end of the seventh duct (26a) is connected to the valve (24) and the other end is connected to the fourth duct (19a), between the reservoir (5a) and the valve (22). The other end of the seventh duct (26) is connected along the fourth duct (19), between the reservoir (5) and the valve (20). According to the arrangement described above:
- In order to create a vacuum inside the reservoir (5), valves (22) and (25) are kept closed and valves (20) and (24) are kept open. Thus, the vacuum generator (8) suctions the gas contained in the reservoir (5) and delivers it to the reservoir (5a), thereby creating a pressure gradient within the reservoir (5a); and
- In order to create a pressure gradient inside the reservoir (5), valves (20) and (24) are kept closed and valves (22) and (25) are kept open. Thus, the vacuum generator (8) suctions the gas from the reservoir (5a) and delivers it into the reservoir (5), thereby creating a vacuum within the reservoir (5a).

According to FIG. 4, when a vacuum is generated within the reservoir (5), the valve (31) is open and the valve (31a) is closed, causing extracted water to flow from the extraction chamber (2) toward the reservoir (5), and the extracted water present in the third duct (6) between the reservoir (5a) and the valve (31a) to increase in pressure, and consequently increase in temperature, and condense. And when a vacuum is generated within the reservoir (5a), the valve (31a) is open and the valve (31) is closed, causing extracted water to flow from the extraction chamber (2) toward the reservoir (5a), and the extracted water present in the third duct (6) between the reservoir (5) and the valve (31) to increase in pressure, and consequently increase in temperature, and condense.

In the embodiment shown in FIG. 4, the moistening of third ducts (6) and (6a) by the liquid desiccant with water is continuous. In order to optimize water extraction, the moistening of the third ducts (6) and (6a) are made to coincide with the closing of the valves (31) and (31a). The above can be achieved by installing valves before the connection of the sprayers (9) and (9a) to the first duct (3), which are to close at the same time as the valves (31) and (31a), respectively. That is:

when the valve (31a) closes, the valve of sprayer (9) opens; and when the valve (31) closes, the valve of sprayer (9a) opens.

According to FIG. 4, the first duct (3), the second duct (4) and the third ducts (6) and (6a) are operationally configured to constitute a heat exchanger (18).

According to FIG. 4, the device comprises:

temperature sensors (28) placed in the extraction chamber (2), the reservoir (5), the first duct (3), the second duct (4), and the third duct (6), and temperature sensors (28a) placed in the reservoir (5a) and the third duct (6a);

a pressure sensor (29) placed in the extraction chamber (2); and a fill-level sensor (30) placed in the extraction chamber (2).

According to FIG. 4, the control device (7) is connected to the vacuum generator (8) and the pump (10), for the purpose of switching them on or off, based on the data provided by the temperature sensors (28) and (28a), the pressure sensor (29) and the fill-level sensor (30). The temperature sensors (28) and (28a), the pressure sensor (29) and the fill-level sensor (30) are connected to the control device (7).

In one embodiment of the invention, the components of the device are coated with thermal insulation, except the control device (7) and the capture means (1).

The liquid desiccant to be used can be a solution of a compound selected from the group consisting of: glycols, $CaCl_2$ brine, $NaCl_2$ brine, and a combination thereof.

If a brine is used as the liquid desiccant:

the salt concentration is between 25% and 35% w/w in the solution of liquid desiccant with water that flows from the capture means (1) toward the extraction chamber (2); and the salt concentration is between 35% and 70% w/w in the solution of liquid desiccant that flows from the extraction chamber (2) toward the capture means (1).

As is apparent, the device of the invention allows for the extraction of water in four steps, namely:

(i) capturing water from the environment by means of the liquid desiccant. This step is performed in the capture means (1);

(ii) extracting water from the liquid desiccant with water by heating the liquid desiccant with water at a pressure lower than atmospheric pressure in a confined space. Heating of the liquid desiccant with water is performed in the extraction chamber (2) (which constitutes the confined space) by creating a pressure gradient within the third duct (6) (and/or the third duct (6a), depending on the embodiment to be implemented);

(iii) condensing the extracted water by subjecting it to a pressure gradient. The extracted water is subjected to a pressure gradient within the third duct (6) (and/or the third duct (6a), depending on the embodiment to be implemented);

(iv) disposing of the extracted water from step (iii) in the reservoir (5) (and/or the reservoir (5a), depending on the embodiment to be implemented).

The phrase 'extracted water' refers to the eater extracted from the liquid desiccant with water, in gas state as well as in liquid state. The extracted water in gas state corresponds to the water evaporated from the liquid desiccant with water in the extraction chamber (2) and in step (ii). And the extracted water in liquid state corresponds to the water condensed by the pressure and temperature gradient in the third duct (6) (and/or the third duct (6a), depending on the embodiment to be implemented) and in step (iii).

The process carried out by the device of the invention does not use heating elements to heat the liquid desiccant with water in order to extract water during operation thereof. That is, heating of the liquid desiccant with water is not a result of heat transferred by a heating element, but rather, by the pressure gradient. For the purposes of this invention, heating elements are understood to mean, for example, electric resistances, burners, and other elements that provide heat from electric, solar, wind, thermal, and other sources.

A person having ordinary skill in the art shall understand the term 'operation' to mean the operational phase of the device, during which the operational variables, such as temperature and pressure ranges, among others, are stabilized. This phase is preceded by the startup phase, which corresponds to the initial operation of the device until it begins the operational phase.

To initiate operation of the device, water vapor is placed within the extraction chamber (2), such that it condenses in the third duct (6) and the heat received by the liquid desiccant with water is transferred into the extraction chamber (2). The water vapor used to initiate operation of the device can be provided or generated by evaporating water from the liquid desiccant with water placed within the extraction chamber. In order to evaporate water from the liquid desiccant with water, a heat source placed within the extraction chamber (2) may be used. This heat source shall only function during the startup phase; it shall not function during the operational phase.

It must be understood that the present invention is not limited to the embodiments described and exemplified herein, and the person having ordinary skill in the art would understand that many other possible variations and modifications can be implemented which do not deviate from the spirit of the invention, which is only defined by the following claims.

The invention claimed is:

1. A device for extracting water from the environment by means of a liquid desiccant, comprising:

a means to capture water from the environment;

an extraction chamber;

a first duct through which the liquid desiccant with water flows from the capture means to the extraction chamber;

a second duct through which the liquid desiccant flows from the extraction chamber to the capture means;

a reservoir to store water extracted from the liquid desiccant in the extraction chamber;

a third duct through which the extracted water flows from the extraction chamber to the reservoir;

a vacuum generator, whose suction point and discharge point are operationally connected to the reservoir in order to:

suction gas contained in the reservoir, and suction the extracted water that flows through the third duct, thereby extracting the extracted water contained in the extraction chamber; and deliver gas to the reservoir, thereby creating a pressure gradient within the reservoir, which is transmitted by the extracted water contained in the reservoir and by the extracted water contained in the third duct into the extraction chamber, thereby increasing the temperature of the extracted water in the duct and in the extraction chamber; and a control device that controls the vacuum generator.

2. The device from claim 1, wherein the capture means is an inclined tray.

3. The device from claim 1, wherein the capture means includes a means that makes gas flow toward the liquid desiccant that flows through the capture means, selected from the group consisting of: a fan, a compressor, a turbine, or a combination thereof.

4. The device from claim 1, wherein the reservoir contains a tank in which extracted water is deposited, and in the volume between the tank and the rest of the volume of the reservoir, the liquid desiccant with water flows from the capture means toward the extraction chamber.

5. The device from claim 4, wherein the tank of the reservoir comprises:
the vacuum generator, whose suction point and discharge point are operationally connected to the reservoir in order to suction the gas contained in the reservoir and deliver gas into the tank;
the third duct through which the extracted water flows from the extraction chamber to the reservoir is connected to the tank; and,
a valve is connected to the tank to allow the outflow of extracted water deposited in the tank.

6. The device from claim 1, wherein the extraction chamber is double-jacketed, having an external jacket and an internal jacket.

7. The device from claim 6, wherein the extraction chamber comprises:
the liquid desiccant with water flows between the external jacket and the internal jacket;
the internal jacket has holes on its bottom, through which the liquid desiccant with water flows toward the bottom of the extraction chamber; and
the extracted water flows into the extraction chamber.

8. The device from claim 1, wherein the extraction chamber is triple-jacketed, having an external jacket, an internal jacket, and a second internal jacket.

9. The device from claim 8, wherein:
the liquid desiccant with water flows between the external jacket and the internal jacket;
the internal jacket has holes on its bottom, through which the liquid desiccant with water flows toward the bottom of the extraction chamber; and
within the extraction chamber, the extracted water flows toward the top of the extraction chamber, where it then flows between the internal jacket and the second internal jacket to exit the extraction chamber.

10. The device from claim 1, wherein the third duct enters the extraction chamber and then exits toward the reservoir.

11. The device from claim 1, wherein the first, second and third ducts are operationally configured to constitute a heat exchanger, wherein the second and third ducts transfer heat to the first duct.

12. The device from claim 1, wherein the first and second ducts are operationally configured to constitute a heat exchanger, wherein the second duct transfers heat to the first duct.

13. The device from claim 1, wherein the first and third ducts are operationally configured to constitute a heat exchanger, wherein the third duct transfers heat to the first duct.

14. The device from claim 1, wherein the liquid desiccant is selected from the group consisting of glycols, $CaCl_2$) brine, $NaCl_2$ brine, and a combination thereof.

15. The device from claim 14, wherein the concentration of $CaCl_2$ brine is:
between 25% and 35% in the solution of liquid desiccant with water; and
between 35% and 70% in the solution of liquid desiccant.

16. The device from claim 1, wherein the control device of the device is operationally connected to one or more of the following elements:
a temperature sensor placed in the extraction chamber, the reservoir, the first duct, the second duct, and the third duct;
a pressure sensor placed in the extraction chamber; and
a fill-level sensor placed in the extraction chamber.

17. The device from claim 1, further comprising:
a plurality of reservoirs to store water extracted from the liquid desiccant with water in the extraction chamber;
a plurality of third ducts through which the extracted water flows from the extraction chamber to the reservoirs;
the vacuum generator, whose suction point and discharge point are operationally connected to the plurality of reservoirs in order to suction the gas contained in one of the plurality of reservoirs and deliver gas into another one of the plurality of reservoirs.

18. A process for extracting water from the environment by the device for extracting water from the environment by means of a liquid desiccant of claim 1, comprising:
capturing water from the environment by means of the liquid desiccant;
extracting water from the liquid desiccant with water by creating a pressure gradient that heats the liquid desiccant with water at a pressure lower than atmospheric pressure in a confined space;
condensing the extracted water by subjecting it to a pressure gradient; and
disposing of the extracted water from step of condensing the extracted water.

* * * * *